(12) United States Patent
Horiguchi et al.

(10) Patent No.: US 9,939,679 B2
(45) Date of Patent: Apr. 10, 2018

(54) DISPLAY DEVICE

(71) Applicant: Sakai Display Products Corporation, Sakai-shi, Osaka (JP)

(72) Inventors: Yuki Horiguchi, Sakai (JP); Hiroki Fukai, Sakai (JP)

(73) Assignee: SAKAI DISPLAY PRODUCTS CORPORATION, Osaka (JP)

( * ) Notice: Subject to any disclaimer, the term of this patent is extended or adjusted under 35 U.S.C. 154(b) by 0 days.

(21) Appl. No.: 14/904,879

(22) PCT Filed: Jul. 8, 2014

(86) PCT No.: PCT/JP2014/068206
§ 371 (c)(1),
(2) Date: Jan. 13, 2016

(87) PCT Pub. No.: WO2015/008665
PCT Pub. Date: Jan. 22, 2015

(65) Prior Publication Data
US 2016/0170265 A1 Jun. 16, 2016

(30) Foreign Application Priority Data
Jul. 19, 2013 (JP) .................................. 2013-150772

(51) Int. Cl.
*G09F 13/04* (2006.01)
*G02F 1/1335* (2006.01)
*G02F 1/1333* (2006.01)

(52) U.S. Cl.
CPC .. *G02F 1/133606* (2013.01); *G02F 1/133308* (2013.01); *G02F 1/133603* (2013.01); *G02F 2001/133317* (2013.01); *G02F 2203/60* (2013.01)

(58) Field of Classification Search
CPC ......... G02F 1/133606; G02F 1/133308; G02F 1/133603; G02F 1/133608; G02F 2001/133317; G02F 2203/60; G02B 6/0025; G02B 6/0043; G02B 6/005;
(Continued)

(56) References Cited

U.S. PATENT DOCUMENTS

2006/0239027 A1* 10/2006 Chen .................... G02B 6/0031
362/600
2011/0255024 A1* 10/2011 Chung et al. ........ G02B 6/0031
349/58

(Continued)

FOREIGN PATENT DOCUMENTS

CN 101681058 A 3/2010
JP 2005-276716 A 10/2005

*Primary Examiner* — Y M. Lee
(74) *Attorney, Agent, or Firm* — Rudy J. Ng; Bret E. Field; Bozicevic, Field & Francis LLP (57) ABSTRACT

The display device comprises a display panel, a light source, an optical plate being arranged to face the display panel and diffusing or guiding the light from the light source, and an optical sheet arranged on one surface of the optical plate, and further comprises a pressing part pressing an edge of the optical sheet, and a facing part coordinating with the pressing part and having a facing surface facing an end surface of the optical plate. The facing surface is slanting so that the distance between the facing surface and the end surface decreases toward the display panel.

8 Claims, 7 Drawing Sheets

(58) Field of Classification Search
CPC .. G02B 6/0051; G02B 6/0053; G02B 6/0086; G02B 6/0088; G09F 2013/0454; G09F 1/0413
See application file for complete search history.

(56) References Cited

U.S. PATENT DOCUMENTS

2012/0014134 A1* 1/2012 Fang et al. ........... G02B 6/0073
362/612
2013/0107168 A1* 5/2013 Tang et al. ........... G02B 6/0088
362/606

* cited by examiner

DISPLAY DEVICE

CROSS-REFERENCE TO RELATED APPLICATIONS

This application is the national phase under 35 U.S.C. § 371 of PCT International Application No. PCT/JP2014/068206 which has an International filing date of Jul. 8, 2014 and designated the United States of America.

BACKGROUND

The present invention relates to a display device comprising a display panel, a light source, an optical plate diffusing or guiding light from the light source, and an optical sheet arranged on one surface of the optical plate.

DESCRIPTION OF THE RELATED ART

A liquid crystal display device comprises a liquid crystal display panel having a display surface on its front surface, a backlight, and so forth. For a backlight, a direct type backlight where a diffusion plate that diffuses the light from LEDs (Light Emitting Diodes) is provided at the rear surface side of the liquid crystal display panel and an optical sheet is provided on the front surface of the diffusion plate is known, for example. An edge light type backlight where a light guide plate is provided at the rear surface side of the liquid crystal display panel with an optical sheet therebetween and LEDs are provided to face an end surface of the light guide plate is also known. The light emitted from the LEDs enters the inside of the light guide plate at the end surface thereof and, after passing through the light guide plate, the light enters the inside of the liquid crystal display panel at the rear surface thereof.

The edges of the above-described optical sheet are held by metal fittings or the like so as to prevent the contact between the optical sheet and the liquid crystal display panel that can be caused by vibration or the like during transportation and can cause damage to the rear surface of the liquid crystal display panel (see Japanese Paten Application Laid-open No. 2005-276716).

SUMMARY

However, the optical sheet expands and shrinks due to the heat from the backlight or the surroundings.

For example, in the case that the optical sheet is held by the metal fittings or the like while expanding, the optical sheet is prevented from expanding smoothly, forming wrinkles or flexure thereat that significantly deteriorate the display quality. The similar wrinkles or flexure are also formed while the optical sheet is shrinking.

In consideration of above-described circumstances, it is an object of the present invention to provide a display device capable of preventing wrinkles or flexure on an optical sheet that deteriorate display quality.

A display device according to the present invention includes a display panel, a light source, an optical plate being arranged to face the display panel and diffusing or guiding light from the light source, and an optical sheet arranged on one surface of the optical plate, further comprising a pressing part pressing an edge of the optical sheet, and a facing part coordinating with the pressing part and having a facing surface facing to an end surface of the optical plate, wherein the facing surface slants so that a distance between the facing surface and the end surface decreases toward the display panel.

In the present invention, the pressing part that presses the edge of the optical sheet, and the facing part that is connected to the pressing part and has a facing surface facing the end surface of the optical plate are provided. The facing surface is slanting so that the distance between the facing surface and the end surface decreases toward the display panel. In other words, when the light source is turned off, the optical sheet is pressed by the pressing part, thus being prevented from moving due to vibration or the like during transportation, which prevents the contact between the optical sheet and the display panel that can cause damage to the liquid crystal display panel. When the light source is turned on and the temperature around the optical sheet and the optical plate is thereby raised, the end surface of the optical plate moves closer to the facing surface of the facing part due to the thermal expansion of the optical plate itself. When the optical plate further expands and the end surface is made in contact with the facing surface, the force applied by the optical plate to the facing part is dispersed at the facing surface toward the display panel, due to the slant of the facing surface that decreases the distance between the facing surface and the end surface towards the display panel. With such a dispersed force, the facing part is pushed toward the display panel, and the pressing force applied by the pressing part to the optical sheet is reduced accordingly. The optical sheet is thereby allowed to expand smoothly, which can prevent the wrinkles or flexure thereat that deteriorate the display quality.

The display device according to the present invention, the pressing part is configured to be separated from the optical sheet by thermal expansion of the optical plate.

In the present invention, the pressing part is configured to be separated from the optical sheet by the thermal expansion of the optical plate. The separation of the pressing part from the optical sheet allows the optical sheet to expand more smoothly, which can prevent the wrinkles or flexure thereat that deteriorate the display quality.

The display device according to the present invention, the optical plate is configured to move the facing part toward the display panel when the end surface pushes the facing surface.

In the present invention, the optical plate moves the facing part toward the display panel, when the end surface thereof pushes the facing surface. When the end surface pushes the facing surface, the force applied by the optical plate toward the facing part is dispersed at the facing surface toward the display panel, due to the slant of the facing surface that decreases the distance between the facing surface and the end surface towards the display panel. The dispersed force moves the facing part toward the display panel. Because the facing part is connected to the pressing part, the pressing part moves toward the display panel. Therefore, the pressing force applied by the pressing part is reduced, or the pressing part is separated from the optical sheet. The optical sheet is thereby allowed to expand smoothly, which can prevent the wrinkles or flexure thereat that deteriorate the display quality. The above and further objects and features will more fully be apparent from the following detailed description with accompanying drawings.

According to the present invention, it is possible to prevent wrinkles or flexure on an optical sheet that deteriorate display quality.

DETAILED DESCRIPTION

Embodiment 1

Figure 1:
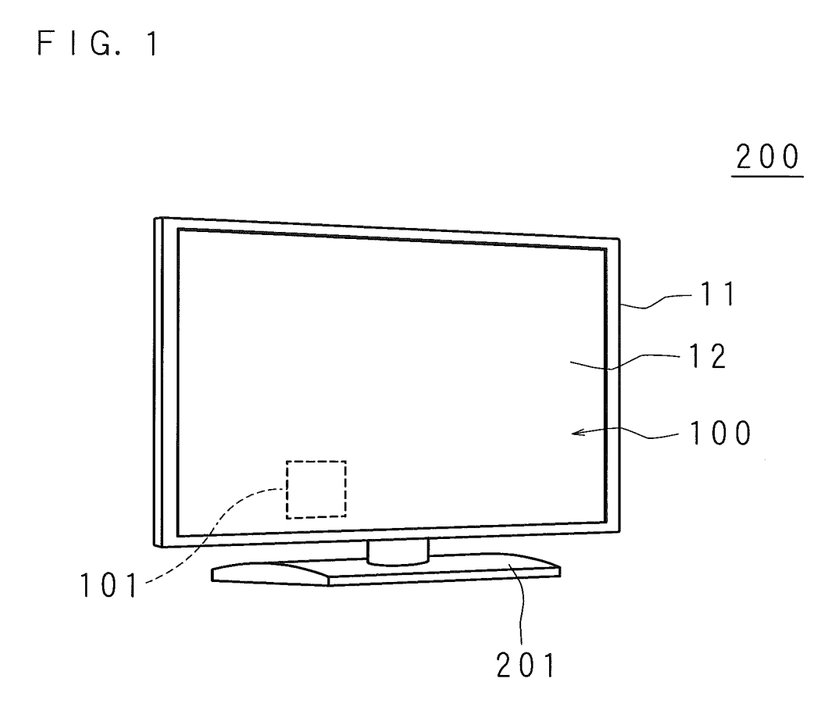
FIG. 1 is a perspective view illustrating the exterior of one exemplified configuration of a television receiver according to Embodiment 1.

The present invention will be described hereinafter with reference to the drawings illustrating the embodiments thereof. FIG. 1 is a perspective view illustrating the exterior of one exemplified configuration of a television receiver 200 according to Embodiment 1. The television receiver 200 comprises a display device 100, a receiving part 101 which receives a television signal, a stand 201, and so forth. The display device 100 displays an image based on the television signal received by the receiving part 101. In addition, the display device 100 comprises a display panel 12 which is a rectangular liquid crystal panel and has one surface for a display surface, a bezel 11 covering the periphery of the display panel 12, and so forth. It should be noted that the display device 100 can be used by itself, as well as being incorporated into the television receiver 200. The details of the display device 100 will be described below.

Figure 2:
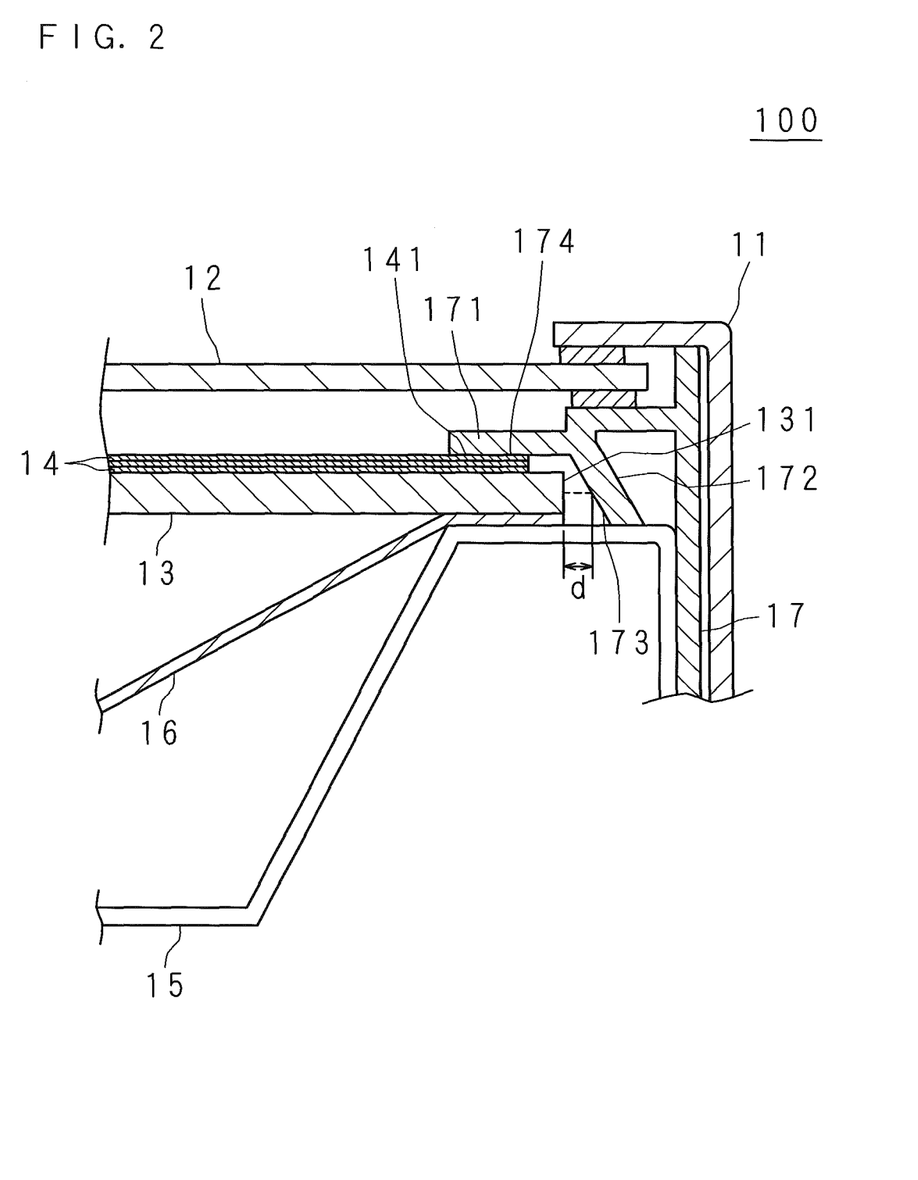
FIG. 2 is a cross-sectional view illustrating main components of a display device according to Embodiment 1.

FIG. 2 is a cross-sectional view illustrating main components of the display device 100 according to Embodiment 1. The display device 100 according to Embodiment 1 employs a so-called direct type backlight. As illustrated in FIG. 2, the display device 100 comprises the display panel 12 having the display surface on one surface (front surface) thereof, a diffusion plate 13 as an optical plate arranged to face the other surface (rear surface) side of the display panel 12, LEDs (light emitting diodes, not illustrated) as a light source arranged at the side opposite to the display panel 12 (also referred to as rear surface side) of the diffusion plate 13, a reflection plate 16 arranged at the rear surface side of the diffusion plate 13 to surround the LEDs, a backlight chassis 15 supporting the diffusion plate 13 and the reflection plate 16, a chassis 17 supporting the display panel 12, a bezel 11 covering the periphery of the display panel 12 and an end surface(s) of the chassis 17, and so forth.

The display panel 12 has a pair of glass substrates on one surface (front surface) and the other surface (rear surface) respectively, between which liquid crystal material is sealed. The light transmittance of the display panel 12 which is determined by the electro-optical property of the liquid crystal material can be altered by applying a voltage to a driver which drives each pixel of the display panel 12, which can control the amount of the light penetrating the display panel 12 for each pixel to display an image in gradation.

The diffusion plate 13 has a rectangular shape, the outline dimensions of which are substantially equal to those of the display panel 12. The diffusion plate 13 diffuses the light emitted from the LEDs (not illustrated) arranged at the rear surface side thereof to direct the uniform light to the rear surface of the display panel 12. The material of the diffusion plate 13 is, but not limited to, acrylic resin or polycarbonate resin, for example. On the display panel side (also referred to as the front surface side) of the diffusion plate 13, an optical sheet 14 is arranged.

The optical sheet 14 has a rectangular shape and a slightly smaller size than the display panel 12. The optical sheet 14 is formed by laminating one or more optical sheets having a function to diffuse light and one or more optical sheets having a function to concentrate light.

The reflection plate 16 reflects the light emitted from the LEDs (not illustrated) to let the reflected light enter the inside of the diffusion plate 13.

The backlight chassis 15 has the outline dimensions which are substantially equal to those of the display panel 12, and has its periphery bent in a substantially U shape. The backlight chassis 15 is arranged to cover the rear surface of the diffusion plate 13 through the reflection plate 16 therebetween.

The chassis 17 is arranged to cover the ends of the display panel 12, the diffusion plate 13 and the backlight chassis 15. The chassis 17 has a pressing part 171 that presses an edge 141 of the optical sheet 14. It should be noted that the chassis 17 and the backlight chassis 15 are not fixed. In other words, the chassis 17 is configured to be slidable with respect to the backlight chassis 15.

The pressing part 171 has a plate shape and a longitudinal dimension of an appropriate length in parallel with the surface of the diffusion plate 13. The pressing part 171 has an abutting surface 174 that abuts the edge 141 of the optical sheet 14. The pressing part 171 has a function to restrict the movement of the optical sheet 14 and a function to position the optical sheet 14.

The chassis 17 also has a facing part 172 coordinating with the pressing part 171. It should be noted that while the example of the structure where the pressing part 171 and the facing part 172 are integrally formed is illustrated in FIG. 2, the pressing part 171 and the facing part 172 are not limited to the integrally formed structure, but may be separate members that are fixed by means for engaging, bonding or the like. In the present embodiment, "coordinating" means that the pressing part 171 and the facing part 172 are capable of moving integrally.

The facing part 172 has a plate-shaped structure being protrudingly formed from the plate-shaped pressing part 171 along the thickness direction of the diffusion plate 13. The facing part 172 has a facing surface 173 facing the end surface 131 of the diffusion plate 13. The facing surface 173 is slanting so that the distance between the facing surface 173 and the end surface 131 decreases toward the display panel 12.

The bezel 11 has a substantially L shaped cross section. The bezel 11 is arranged to cover the chassis 17 as well as the periphery of the display panel 12. The bezel 11 and the chassis 17 are fixed to each other by screws, for example. The bezel 11 and the chassis 17 may be engaged with each other, instead of being fixed with screws.

As illustrated in FIG. 2, when the display device 100 is not in operation (power is turned off or the light source is turned off), the temperature inside the display device 100 is substantially equal to the surrounding temperature (at room temperature). In this case, the end surface 131 of the diffusion plate 13 and the facing surface 173 are separated by an appropriate distance (dimension d, for example). The dimension d can be determined to be about 0.5 mm to 1 mm, for example, in consideration of a dimension tolerance.

In addition, the pressing part 171 presses the optical sheet 14 with a required pressing force, while the abutting surface 174 of the pressing part 171 abuts the edge 141 of the optical sheet 14. Therefore, when the display device 100 is not in use, for example in transportation, the optical sheet 14 is pressed by the pressing part 171, being prevented from moving due to vibration or the like during transportation, which prevents the contact between the optical sheet 14 and the display panel 12 that can cause damage to the display panel 12.

Figure 3:
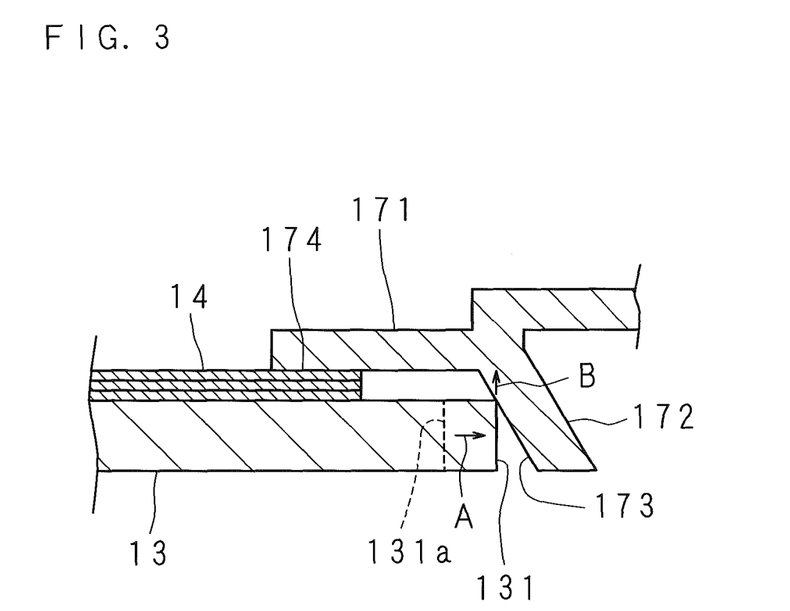
FIG. 3 is a schematic view illustrating one example of an occurrence of thermal expansion of the diffusion plate during the use of the display device according to Embodiment 1.

The operation of the display device 100 will be described next. FIG. 3 is a schematic view illustrating one example of an occurrence of thermal expansion of the diffusion plate 13 during the use of the display device 100 according to Embodiment 1. When the display device 100 is turned on, the LEDs of the backlight are turned on and the driver of the display panel 12 starts operating, which raises the temperature inside the display device 100. Such rise in temperature makes diffusion plate 13 expand vertically and laterally at the intrinsic thermal expansion coefficient. FIG. 3 illustrates the example in one direction. The optical sheet 14 also expands vertically and laterally due to such rise in temperature, depending on its intrinsic thermal expansion coefficient.

In the present embodiment, it is configured that the end surface 131 pushes the facing surface 173 due to the thermal expansion of the diffusion plate 13, and the pressing force applied by the pressing part 171 to the optical sheet 14 is reduced accordingly.

For example, as illustrated in FIG. 3, when the diffusion plate 13 expands vertically and laterally, the end surface 131 moves closer to the facing surface 173 from the position of the end surface 131a at room temperature. Consequently, a portion of the end surface 131 contacts the facing surface 173. When further expansion of the diffusion plate 13 makes the end surface 131 press the facing surface 173, the force applied by the diffusion plate 13 to the facing part 172 (the force applied along the direction denoted as A in FIG. 3) is dispersed at the facing surface 173 toward the display panel 12 (the direction denoted as B in FIG. 3), due to the slant of the facing surface 173 that decreases the distance between the facing surface 173 and the end surface 131 towards the display panel 12. With such a dispersed force, the facing part 172 is pushed toward the display panel 12, and the pressing force applied by the pressing part 171 to the optical sheet 14 is reduced accordingly. The optical sheet 14 is thereby allowed to expand smoothly, which can prevent the wrinkles or flexure thereat that deteriorate the display quality.

Figure 4:
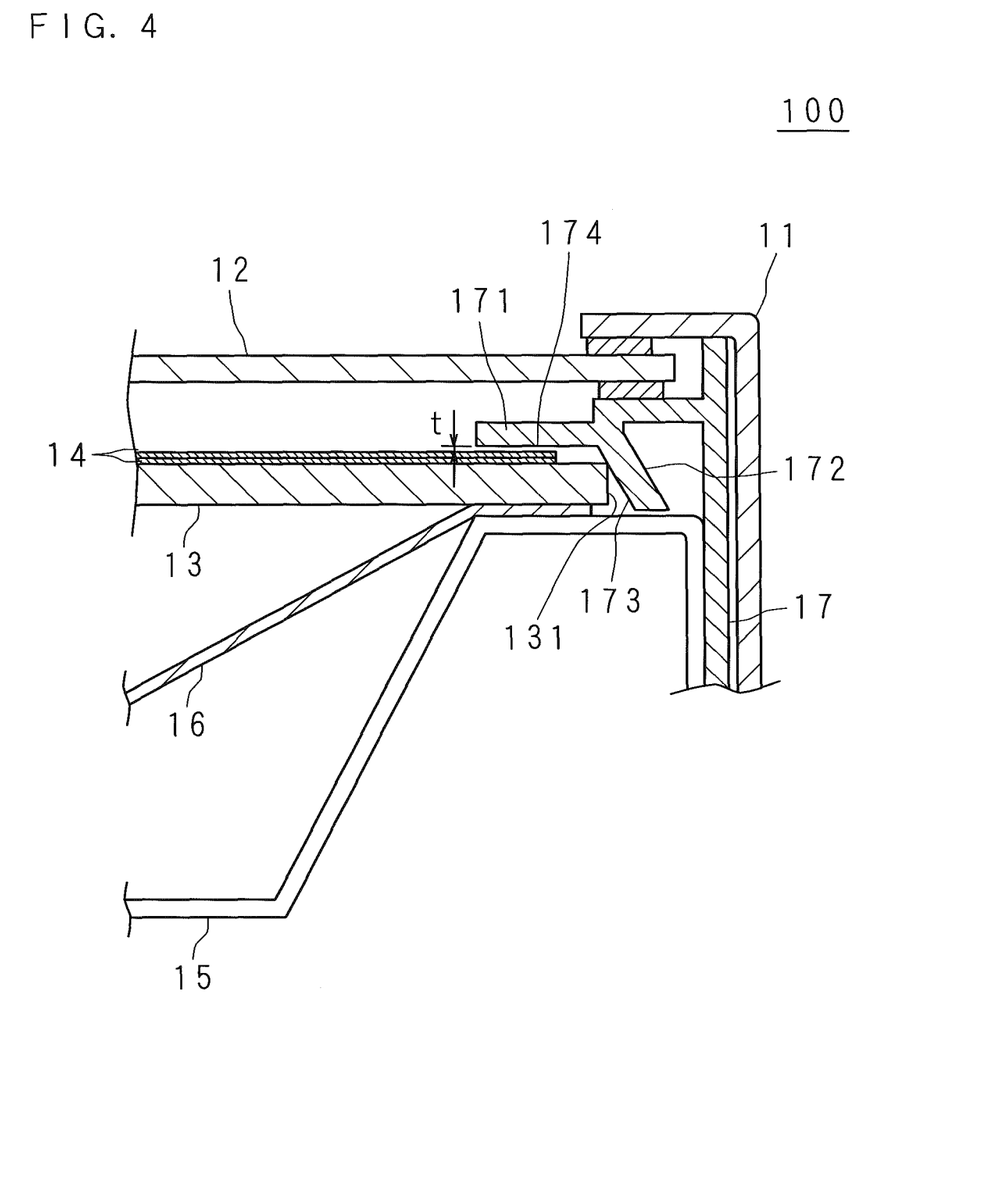
FIG. 4 is a cross-sectional view illustrating main components of the display device according to Embodiment 1 during its use.

FIG. 4 is a cross-sectional view illustrating main components of the display device 100 according to Embodiment 1 during its use. In the present embodiment, the pressing part 171 is configured to be separated from the optical sheet 14 by the thermal expansion of the diffusion plate 13. Such separation of the pressing part 171 from the optical sheet 14 allows the optical sheet 14 to expand more smoothly, which can prevent the wrinkles or flexure thereat that deteriorate the display quality.

As illustrated in FIG. 4, for example, when the end surface 131 pushes the facing surface 173, the diffusion plate 13 moves the facing part 172 toward the display panel 12. When the end surface 131 pushes the facing surface 173, the force applied by the diffusion plate 13 toward the facing part 172 is dispersed at the facing surface 173 toward the display panel 12, due to the slant of the facing surface 173 that decreases the distance between the facing surface 173 and the end surface 131 towards the display panel 12. The dispersed force moves the facing part 172 toward the display panel 12. The facing part 172 and the pressing part 171 coordinate with each other, because they are connected to each other. Accordingly, the pressing part 171 moves toward the display panel 12 to be separated from the optical sheet 14 (at the dimension denoted as t in FIG. 4). The optical sheet 14 is thereby allowed to expand smoothly, which can prevent the wrinkles or flexure thereat that deteriorate the display quality.

The pressing part 171 and the facing part 172 may be provided at one side, two sides, three sides or all the four sides of the four side edges of the diffusion plate 13.

According to the present embodiment, it is also possible to provide the television receiver capable of preventing the wrinkles or flexure on the optical sheet that deteriorate the display quality.

Embodiment 2

Figure 5:
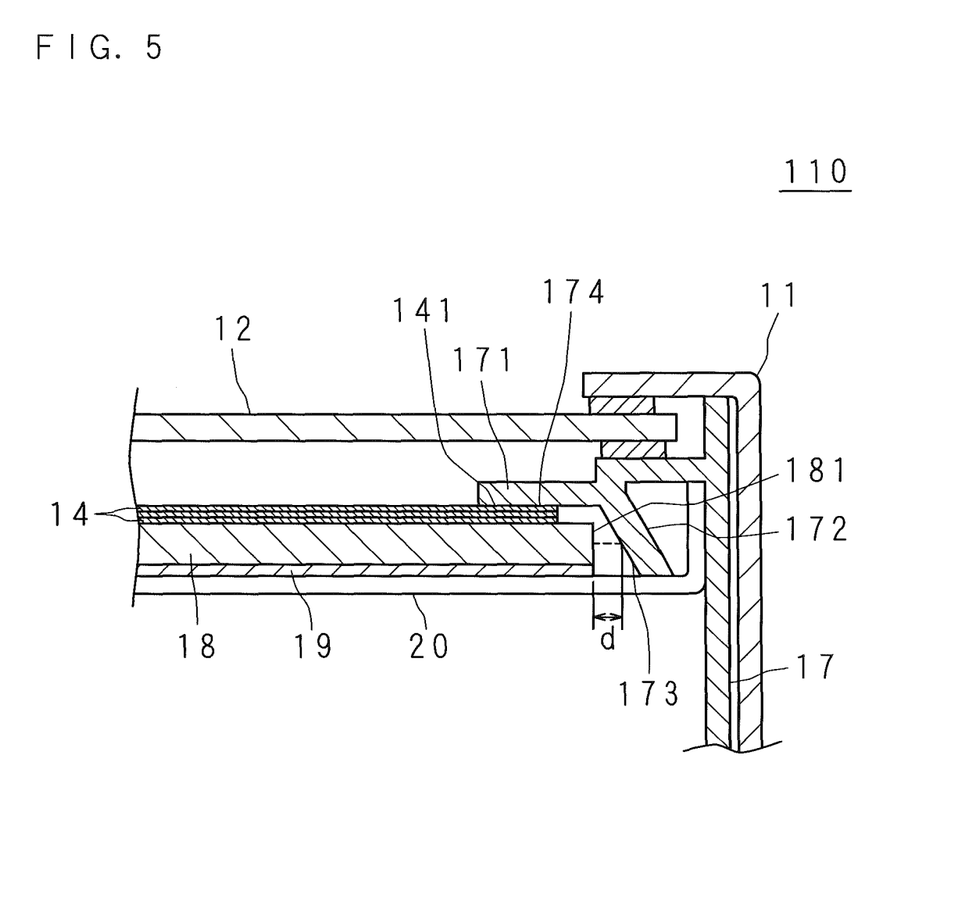
FIG. 5 is a cross-sectional view illustrating main components of a display device according to Embodiment 2.

FIG. 5 is a cross-sectional view illustrating main components of a display device 110 according to Embodiment 2. While, in Embodiment 1 described above, the display device employs the so-called direct type backlight, the display device is not limited to such a configuration but may employ a so-called edge light type backlight. The display device 110, illustrated as an example in FIG. 5, employs the edge light type backlight. It is different from Embodiment 1 in that the display device 110 comprises a light guide plate 18, a reflection sheet 19 and a backlight chassis 20, instead of the diffusion plate 13, the reflection plate 16 and the backlight chassis 15 according to Embodiment 1.

The light guide plate 18 functions as an optical plate. The light guide plate 18 has a rectangular shape, the outline dimensions of which are substantially equal to those of the display panel 12. The material of the light guide plate 18 is, but not limited to, acrylic resin or polycarbonate resin, for example.

The reflection sheet 19 has substantially the same size as that of the light guide plate 18. The reflection sheet 19 reflects the light emitted from the back surface (rear surface) of the light guide plate 18 and let the light reenter the inside of the light guide plate 18.

The backlight chassis 20 has the outline dimensions that are substantially equal to those of the display panel 12, and has its periphery bent in a substantial L shape. The backlight chassis 20 supports and fixes the light guide plate 18.

A substrate (not illustrated) is provided to face the end surface 181 of the light guide plate 18. The substrate has a length that is substantially equal to the vertical or lateral dimension of the light guide plate 18. On the substrate, a plurality of LEDs (not illustrated) are mounted. In the case that the display device comprises the bezel 11 consisting of four top, bottom, left and right sides, as exemplified in FIG. 1, the substrate on which LEDs are mounted may be arranged at only the inner bottom side of the bezel 11, or the two inner left and right sides of the bezel 11. In FIG. 5, an example of main components at the side of the bezel where the substrate is not arranged is illustrated.

As illustrated in FIG. 5, similarly to Embodiment 1, the end surface 181 of the light guide plate 18 and the facing surface 173 are separated at an appropriate distance (dimension d, for example) in Embodiment 2. In addition, the pressing part 171 presses the optical sheet 14 with a required pressing force, while the abutting surface 174 of the pressing part 171 abuts the edge 141 of the optical sheet 14. Therefore, when the display device 100 is not in use, for example in transportation, the optical sheet 14 is pressed by the pressing part 171, being prevented from moving due to vibration or the like during transportation, which prevents the contact between the optical sheet 14 and the display panel 12 that can cause damage to the display panel 12.

The details of the occurrence of the thermal expansion of the light guide plate 18 during the use of the display device 110 will not be described, as being similar to that in Embodiment 1. In Embodiment 2, it is also configured that the end surface 181 pushes the facing surface 173 due to the thermal expansion of the light guide plate 18, and the pressing force applied by the pressing part 171 to the optical sheet 14 is reduced accordingly. In addition, the pressing part 171 is configured to be separated from the optical sheet 14 by the thermal expansion of the light guide plate 18. Such separation of the pressing part 171 from the optical sheet 14 allows the optical sheet 14 to expand more smoothly, which can prevent the wrinkles or flexure thereat that deteriorate the display quality.

Figure 6:
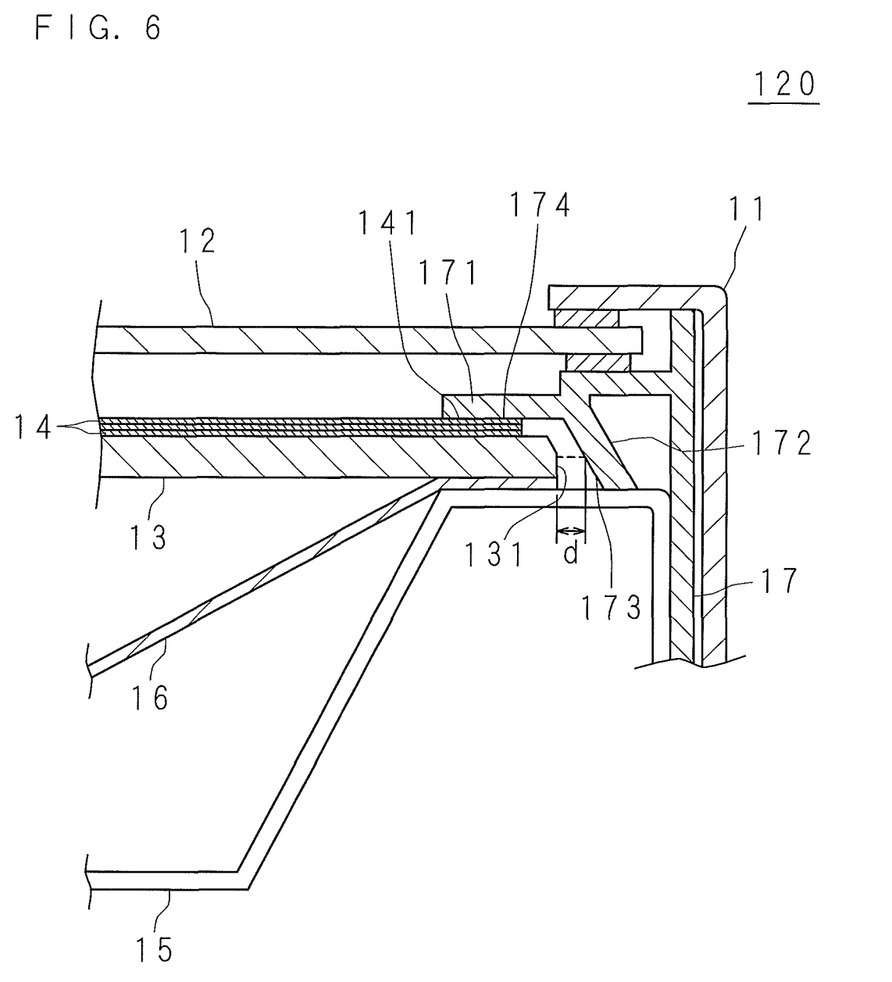
FIG. 6 is a cross-sectional view illustrating main components of a display device according to Embodiment 3.
Figure 7:
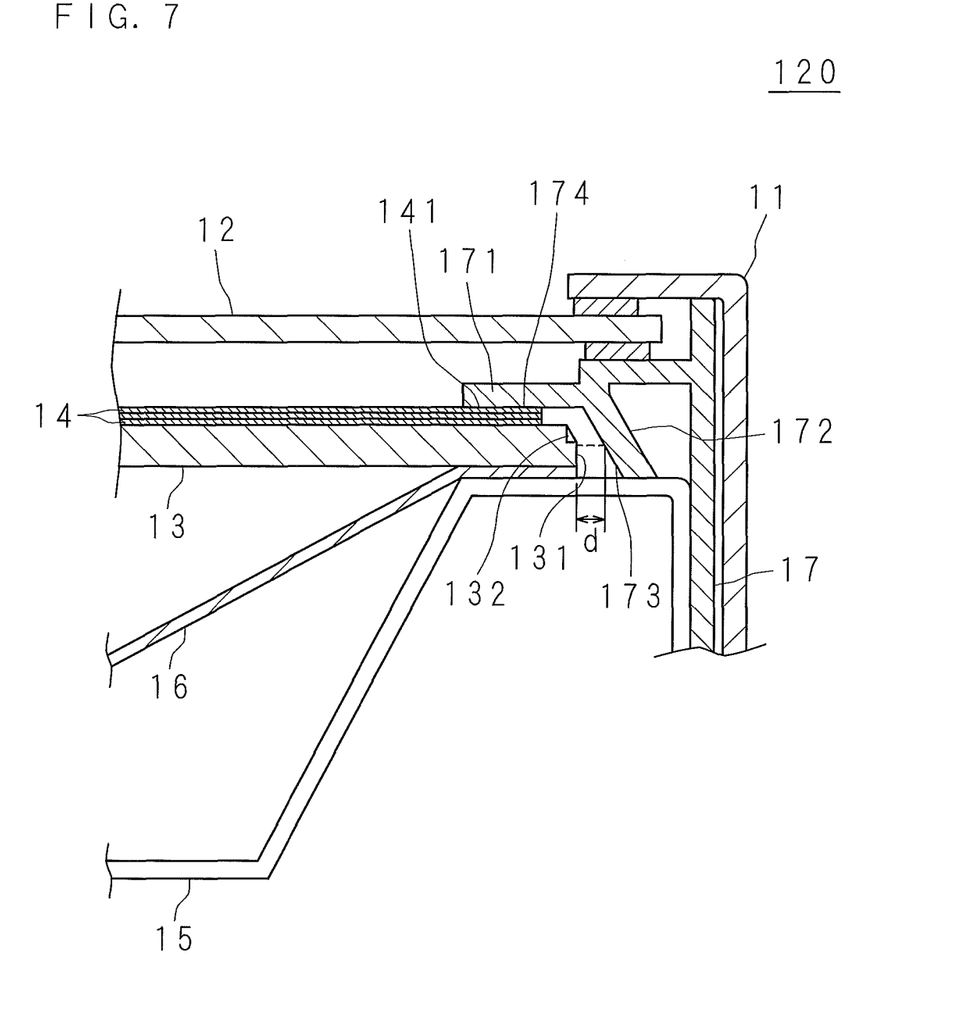
FIG. 7 is a cross-sectional view illustrating main components of a display device according to Embodiment 4.

In Embodiments 1 and 2 described above, the front surface and the end surface 131 of the diffusion plate 13 intersect at the right angle, while the front surface and the end surface 181 of the light guide plate 18 intersect at the right angle. The configurations are however not limited thereto. For example, in the display device 120 according to Embodiment 3, 4, the edge closer to the optical sheet 14 of the end surface 131 of the diffusion plate 13 may be formed in a tapered shape, to make the edge parallel with the facing surface 173 of the facing part 172. In this case, the edge of the diffusion plate 13 may be molded, or a tapered separate member 132 may be fixed to the edge of the diffusion plate 13. Such a tapered edge facilitates the end surface 131 to slide with respect to the facing surface 173, which can smoothly reduce the pressing force applied by the pressing part 171, or can separate the pressing part 171 from the optical sheet 14. In addition, the light guide plate 18 may be formed similarly.

Technical features described in the above embodiments of the present invention can form a new technical solution in combination with each other.

It is noted that, as used herein and in the appended claims, the singular forms "a", "an", and "the" include plural referents unless the context clearly dictates otherwise.

As this description may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A display device, comprising a display panel, a light source, an optical plate being arranged to face the display panel and diffusing or guiding light from the light source, and an optical sheet arranged on one surface of the optical plate, further comprising:
    a pressing part pressing an edge of the optical sheet, and
    a facing part coordinating with the pressing part and having a facing surface facing to an end surface of the optical plate,
    wherein the facing surface slants so that a distance between the facing surface and the end surface decreases toward the display panel,
    the pressing part has an abutting surface that abuts the edge of the optical sheet,
    the optical sheet is sandwiched by the abutting surface and the optical plate, such that the optical sheet is fixed, and
    the pressing part is configured to be separated from the optical sheet by thermal expansion of the optical plate.

2. The display device according to claim 1, wherein the optical plate is configured to move the facing part toward the display panel when the end surface pushes the facing surface.

3. A display device, comprising a display panel, a light source, an optical plate being arranged to face the display panel and diffusing or guiding light from the light source, and an optical sheet arranged on one surface of the optical plate, further comprising:
    a pressing part pressing an edge of the optical sheet, and
    a facing part coordinating with the pressing part and having a facing surface facing to an end surface of the optical plate,
    wherein the facing surface slants so that a distance between the facing surface and the end surface decreases toward the display panel, and
    an edge closer to the optical sheet of the end surface of the optical plate is formed in a tapered shape to make the edge of the optical plate parallel with the facing surface.

4. The display device according to claim 3, wherein the edge of the optical plate is molded in a tapered shape.

5. The display device according to claim 3, wherein a tapered member is fixed to the edge of the optical plate.

6. The display device according to claim 3, wherein the optical plate is configured to move the facing part toward the display panel when the end surface pushes the facing surface.

7. The display device according to claim 4, wherein the optical plate is configured to move the facing part toward the display panel when the end surface pushes the facing surface.

8. The display device according to claim 5, wherein the optical plate is configured to move the facing part toward the display panel when the end surface pushes the facing surface.

* * * * *